July 31, 1962 L. D. BROWN, JR 3,047,437

METHOD OF MAKING A RECTIFIER

Filed Aug. 19, 1957

INVENTOR.
LAKE D. BROWN, JR.

BY
D. Gordon Angus
ATTORNEY 3,047,437
Patented July 31, 1962

3,047,437

METHOD OF MAKING A RECTIFIER

Lake D. Brown, Jr., Torrance, Calif., assignor to International Rectifier Corporation, El Segundo, Calif., a corporation of California Filed Aug. 19, 1957, Ser. No. 678,983
5 Claims. (Cl. 148—1.5)

Figure 1:
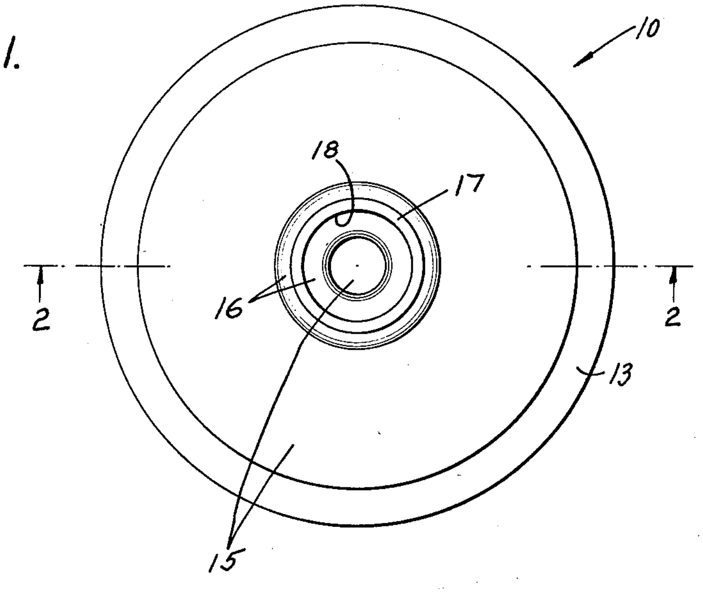

This invention relates to crystal junction rectifiers of the silicon type, and has for an object to improve the performance characteristics of such rectifiers.

Silicon junction rectifiers are well known. They commonly comprise a silicon crystal attached to a base plate with an activating metal such as aluminum or other Group III metal in contact with the silicon. According to one method of assembling such a junction, a layer or wafer of silicon is placed on the base plate with a thin layer oc solder between the base plate and the silicon; and a thin layer of the aluminum is placed on top of the silicon, with a metallic element or contact over the aluminum. This assembly of parts is held in a jig and placed in a furnace at a high enough temperature, for example, about 900° C., to melt the solder and the aluminum, whereupon the assembly is removed from the furnace and allowed to cool rapidly down to ambient temperature, which will solidify the solder and the aluminum and hold the parts of the junction together. Such an assembled junction functions as a rectifier in a well known manner and it will for example stand a substantial voltage, for example in the order of thirty volts in the reverse direction with a leakage current of for example some 40 milliamperes.

While a junction made as described above has good rectifying properties, I have discovered in accordance with the present invention that the rectifying properties of the junction can be greatly improved by an annealing treatment. The annealing temperature should be kept high, but below the melting point of the solder or other metal of the junction; and it should be carried on for a substantial period of time. In accordance with a preferred feature the annealing should be carried on over a cycle providing for a gradual temperature rise to the maximum annealing temperature and a gradual temperature fall from the maximum annealing temperature at the end of the cycle. By the procedure, strains which may have formed during the initial heating to assemble the junction, are relieved and they are avoided during the annealing treatment. It is believed that the presence of such strains pursuant to the initial forming of the junction operate to limit the voltage-withstanding ability of the junction; and that the relief of such strains according to the present invention is responsible for the increased voltage-withstanding ability and relatively low leakage current.

I have found that a preferred maximum annealing temperature is about 600° C. In carrying out the temperature cycle, the temperature of the junction can be brought up gradually to this maximum temperature over a period of for example five to ten minutes; then left at the maximum temperature for a substantial time such as about ten minutes and then gradually cooled down over a period of about five to ten minutes to ambient temperature.

Figure 2:
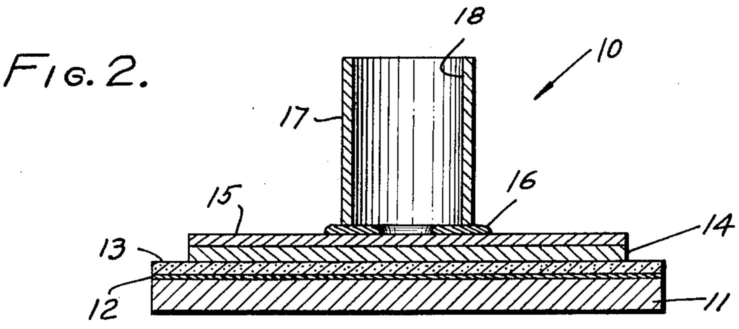

The foregoing and other features will be more fully understood from the following description and accompanying drawing of which:

FIG. 1 shows a top view of a rectifier constructed according to the invention; and FIG. 2 is a section view taken at line 2—2 of FIG. 1.

Shown in the drawings is a crystal junction rectifier 10 of a common construction suitable for heat treatment in accordance with this invention. The rectifier 10 has a base plate 11 in the form of a flat circular disk preferably of molybdenum. A layer of solder 12, relatively thin in comparison to the base plate 11 is between the molybdenum base plate and a crystalline semi-conductor wafer 13 of silicon. The silicon semi-conductor wafer 13 is of high purity, such as is commercially available for rectifier manufacture. Above the silicon wafer 13 there is an activating material 14 commonly used with such crystalline wafer rectifiers. The activating material 14 is a Group III metal, preferably of aluminum. Above the aluminum 14 there is a conductive disk 15, preferably of molybdenum, attached by solder 16 to a tubular conductive contact 17, preferably of copper. The contact 17 is constructed with a hollow center 18 to provide a means so that attachment to the contact 17 may be easily made at the hollow center 18.

It should be understood that in the drawing, the layers on the base plate 11 are not drawn in proportion to their relative thickness; and ordinarily they will be considerably thinner than represented. The reason the layers are shown as thick as appears in the drawing is for ease of illustration.

The rectifier 10 is held together in the relative position of its various parts, as best shown in FIG. 2, by means of a jig or clamp or the like. The holding jig (not shown) and rectifier 10 are then placed in a suitable furnace heated to an elevated temperature, which may be about 900° C. for one or two minutes to form the junction. This temperature is sufficiently high to melt the solder layers 12 and 16 and also the aluminum layer 14 which acts as its own solder. The aluminum 14 melts and fuses with the silicon wafer 13 and also joins to form an aluminum solder bond with the conductive wafer 15 of molybdenum. The molybdenum base plate 11 has a coefficient of expansion which is matched or substantially the same as the coefficient of expansion of the silicon wafer 13 to prevent forming undue stresses between these two parts of the rectifier.

After being at the high temperature of about 900° C. temperature for about one to two minutes, the rectifier 10 is removed from the furnace and allowed to cool rapidly to ordinary ambient temperature. Simply letting it cool in the air at room temperature will be satisfactory. The rectifying properties of the junction are present at the interface of the silicon wafer 13 and the activating layer 14 of aluminum in the now completed rectifier. Without any further treatment the silicon crystal junction will function as a rectifier; and it can be operated at approximately 30 volts without more than about 40 milliamperes of leakage current in the reverse direction through the rectifier.

In accordance with the present invention the characteristics and performance of the junction are greatly improved by an annealing treatment. This involves heating the junction which has been formed as described above for example, at an elevated temperature for a substantial period of time as compared with the heating time used in making the junction. This can be done by putting the junction in a furnace, preferably in a hydrogen atmosphere at a temperature somewhat below the melting point of the metal in the junction, for example about 600° C. for a period of time such as approximately twenty-five minutes. This is preferably done in a timed annealing cycle having controlled temperatures. In the first part of the cycle the silicon junction rectifier 10 is heated slowly at a preferably uniform rate of temperature increase for about seven and one-half minutes from ordinary room temperature to the ultimate highest furnace annealing temperature of approximately 600° C. The rectifier is kept as this highest annealing temperature for about ten minutes, in this intermediate part of the cycle. In the last part of the cycle the rectifier 10 is cooled slowly at a preferably uniform rate for about seven and one-half minutes from 600° C. to room temperature. The time of the entire annealing cycle is the above-mentioned approximately twenty-five minutes in length.

It has been found that a rectifier 10 which for example operated up to a maximum of about 30 volts at about 40 milliampere leakage current prior to the annealing treatment, is after the annealing cycle capable of operating at as much as 70 volts or better and without exceeding the 40 milliampere leakage current through the rectifier in the reverse direction.

Although the time and temperature just described are preferred for the annealing treatment, it will be understood that some variation of the times and temperatures of annealing are permissible.

Since rectifiers annealed according to this invention are able to operate at much higher voltages than the same type rectifier not subjected to the annealing cycle, it will be recognized that the annealing provides a safety factor in voltage-withstanding capability. Furthermore the higher voltage capability permits space saving by reducing the number of junctions required to be connected in series for higher voltage applications.

In the use of the rectifier, the base plate serves as one terminal, and the tubular contact 17 acts as the other terminal. A stranded cable connector or the like may be attached within the member 17 as by soldering or crimping.

While only one particular embodiment of a preferred crystalline semi-conductor rectifier and method of its annealing has been shown and described, it is my desire that the invention shall not be limited to this specific embodiment and method, but shall be limited only in accordance with the following claims since persons skilled in the art may devise other embodiments still within the limitations of said claims.

I claim:

1. The method of annealing a silicon junction type rectifier of the type comprising silicon having fused to it a material which forms the junction, which comprises heating said rectifier for about five to ten minutes during which time the temperature of said rectifier is raised from ambient temperature to about 600 degrees C., then maintaining the temperature of said rectifier at about 600 degrees C. for about ten minutes, then cooling said rectifier from said 600 degrees C. temperature to ambient temperature in about five to ten minutes.

2. The method according to claim 1 in which the heating cycle is carried out in a hydrogen atmosphere.

3. The method of making a rectifier; said method comprising the steps of assembling a base plate, a silicon wafer, and a junction forming material with solder material interposed between said wafer and said base plate; heating said assembly to a temperature at which said junction forming material forms a junction with one surface of said silicon wafer and said solder material melts; cooling said assembly to solidify said solder to form a bond between said base plate and said silicon wafer, and thereafter reheating said assembly to approximately 600° C. to anneal said assembly and increase the inverse voltage withstanding ability of said rectifier.

4. The method of making a rectifier; said method comprising the steps of assembling a base plate, a silicon wafer, and a junction forming material with solder material characterized in melting at above 600° C. interposed between said wafer and said base plate, heating said assembly to a temperature at which said junction forming material forms a junction with one surface of said silicon wafer and said solder material melts, cooling said assembly to solidify said solder to form a bond between said base plate and said silicon wafer, and thereafter reheating said assembly from substantially ambient temperature for a time of at least approximately five minutes to approximately 600° C., and retaining said last-mentioned temperature at least approximately five minutes, and thereafter cooling said assembly to substantially ambient temperature in at least approximately five minutes to anneal said assembly and increase the inverse voltage withstanding ability of said rectifier.

5. The method of increasing the reverse voltage-withstanding ability with a given reverse current of a rectifier of the type comprising silicon crystal soldered to a base plate and aluminum fused to the crystal to form a junction at the silicon, which comprises heating the rectifier at a substantially uniform rate in approximately 7½ minutes to about 600° C., maintaining the temperature at about 600° C. for about 10 minutes, and then cooling the rectifier at a substantially uniform rate in a hydrogen atmosphere to room temperature in approximately 7½ minutes, whereby internal stresses in the rectifier are relieved.

References Cited in the file of this patent

UNITED STATES PATENTS

| | | |
|---|---|---|
| 2,694,168 | North et al. | Nov. 9, 1954 |
| 2,744,970 | Shockley | May 8, 1956 |
| 2,748,325 | Jenny | May 29, 1956 |
| 2,781,481 | Armstrong | Feb. 12, 1957 |
| 2,785,096 | Adcock | Mar. 12, 1957 |
| 2,808,315 | Bemski | Oct. 1, 1957 |
| 2,818,361 | Anderson | Dec. 31, 1957 |
| 2,827,436 | Bemski | Mar. 18, 1958 |